UNITED STATES PATENT OFFICE.

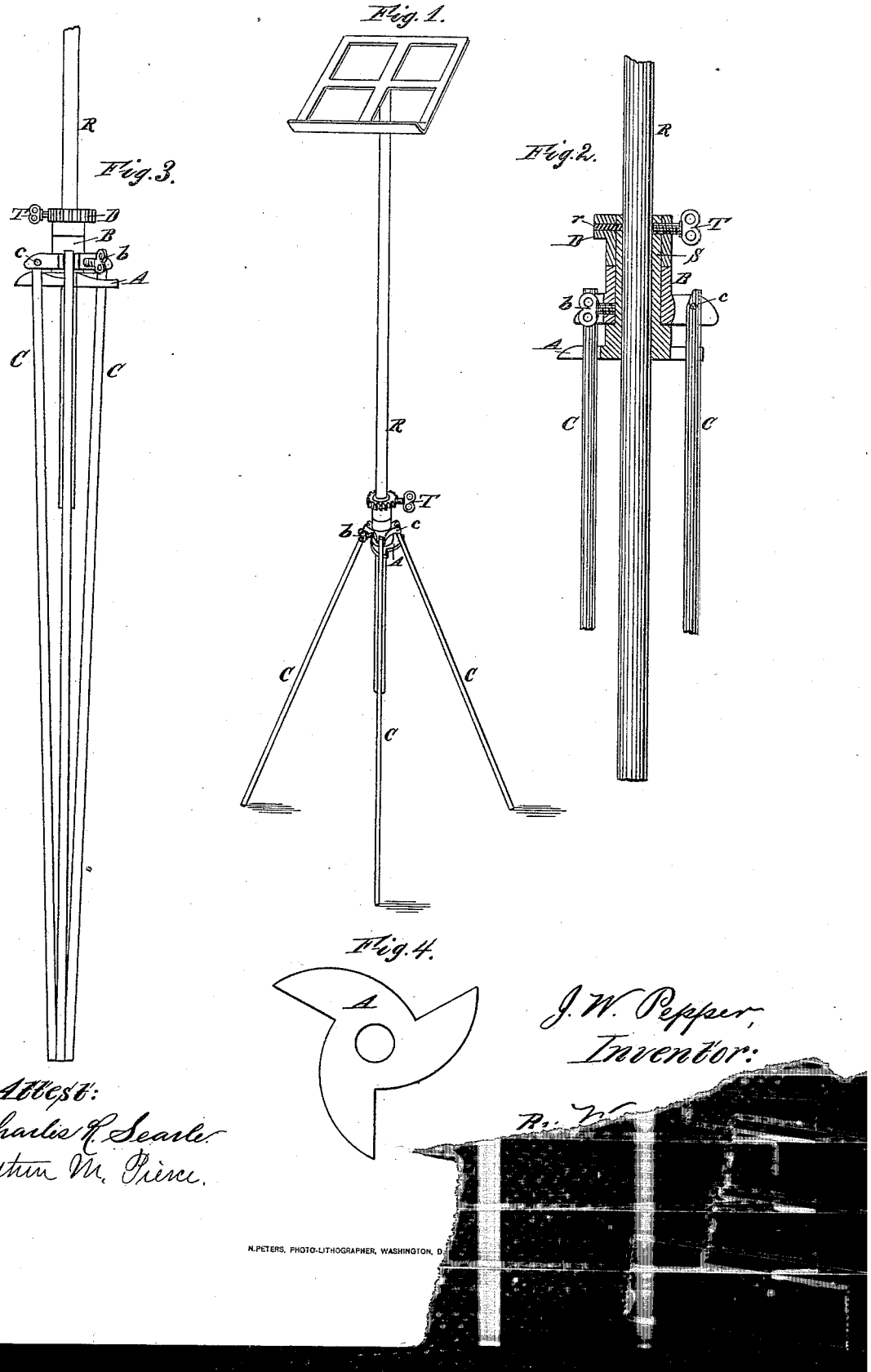

JAMES W. PEPPER, OF PHILADELPHIA, PENNSYLVANIA.

MUSIC-STAND.

SPECIFICATION forming part of Letters Patent No. 229,271, dated June 29, 1880.

Application filed April 28, 1880. (No model.)

*To all whom it may concern:*

Be it known that I, JAMES W. PEPPER, of Philadelphia, in the county of Philadelphia and State of Pennsylvania, have invented a new and useful Improvement in Music-Stands, of which the following is a full, clear, and exact description, reference being had to the accompanying drawings, and to the letters of reference marked thereon, the same not having been to my knowledge heretofore patented in any foreign country.

My invention has special relation to that class of devices used by musicians for the purpose of holding sheet-music at any desired height for convenience in reading the same, and is of such a character that it may be folded up into a small compass when not in use, and for convenience in moving from place to place or for packing the same for shipment, and when opened and the supporting-legs spread out the whole is rendered firm and steady by a simple mechanical device, requiring but a moment's time to accomplish the change.

From the simplicity of arrangement my improved music-stand may be manufactured at a trifling cost, and by the use of both wood and iron in the construction the whole is rendered light and easy to transport from place to place.

As heretofore constructed and arranged music-stands of the character herein shown and described have been heavy and cumbersome to handle and remove from place to place, liable to get out of order, the parts to become worn by constant use, rendering the stand unsteady when set up, and unsatisfactory in many respects. By my improved construction these difficulties and objections are entirely overcome.

The stand, being made partly of wood and partly of iron, is rendered as light as is possible consistent with durability, and is made so simple that it may be readily understood and adjusted by any person likely to use it.

To accomplish all of this the invention involves certain novel and useful arrangements or combinations of parts and peculiarities of construction, all of which will be hereinafter first fully described, and then pointed out in the claim.

In the drawings, Figure 1 is a perspective view of my improved folding music-stand. Fig. 2 is a vertical axial sectional view of the same. Fig. 3 is an elevation, showing the stand when folded up. Fig. 4 is a plan view of the cams for holding the legs of the stand in place when set up for use.

Like letters of reference wherever they occur indicate corresponding parts in all the figures.

A is the cam-block, bearing three cam-surfaces, employed for holding the legs of the stand in place when the same is set up for use, said cam-block being made of cast-iron or any other preferred metal. This cam-block is hollow through the length of its shaft. Upon this shaft, a short distance above the ratchet, is a shoulder, the diameter of the shaft being made much smaller thereabove. Upon and above this shoulder is located a ring, B, bearing the legs C, which support the stand when in use. This ring is provided with three slotted projections, in which I place the upper ends of the supporting-legs. A rivet, c, passing through the same holds the legs in place in the slots. The holes through the legs are made larger than the rivet in order to permit the same to swing easily thereon. The ends of the legs above the rivets are beveled upon the inside, so that when spread out to the required distance they will find a firm bearing against the back of the slot in which they play.

The leg-bearing ring B fits around the hollow shaft S loosely, so as to allow it to turn easily thereon.

*b* is a thumb-screw passing through a screw-threaded perforation in ring B, and when screwed up tightly bears upon the central hollow shaft, S, in such a manner as to hold the cam-block A firmly in any desired position.

Upon the top of shaft S is a corrugated or notched ring, D, riveted at one side to said shaft, as shown at *r*. Upon the opposite side of D is a screw-threaded perforation passing through both ring D and hollow shaft S. In this perforation is located the thumb-screw T, intended to bear against the wooden central rod, R, said rod passing down through the hollow shaft S, playing freely therein, and is designed to support a music-holder of any approved pattern upon its upper end. By loosening thumb-screw T this rod may be raised or lowered to suit the convenience of the musician using the improved stand, and by turning the thumb-screw hard against said rod it is held firmly in place wherever located. In many of the music-stands now in use this rod is made of iron, adding to the cost of construction and to the weight of the stand when completed. By the use of wood for this purpose I am enabled to manufacture my improved stand at a small cost, and the same is much lighter and is more readily transported from place to place.

When constructed and arranged in accordance with the foregoing description, the operation of my improved music-stand is as follows: The thumb-screw $b$ is first loosened. The legs are then spread out as far as the construction of the device will permit, their spread being great enough to give the stand a firm lateral support in each direction. By grasping the notched or corrugated ring D (said notches or corrugations being formed therein for the purpose of securing a firm hold thereon) and turning the same to the left, the projecting arms or cams on cam-block A will be forced against the legs in such a manner as to hold them firmly and securely in place. The thumb-screw $b$, bearing against the central hollow shaft, prevents the disarrangement of the parts after being placed in position, as described.

This device is so simple and is so arranged that it is impossible to get the same out of order, or in any way damage it by constant use.

After setting the stand up, as described, the height of the music-supporting rod may be regulated, as before explained.

When it is desired to take down and remove the stand, the thumb-screw $b$ is loosened and the cam-block A turned back to the right, thus allowing the legs to drop back toward each other into a small and compact space.

As thus constructed and arranged it will be seen that my improved music-stand admirably answers the uses and purposes for which it is designed.

Having now fully described my invention, what I claim as new, and desire to secure by Letters Patent, is—

The turning cam-block A, having hollow shaft S, thumb-screw $b$, leg-supporting ring B, hinged legs C, corrugated or notched ring D, thumb-screw T, and adjustable rod R, the whole being combined and arranged to operate substantially as shown and described.

In testimony that I claim the foregoing I have hereunto set my hand in the presence of two witnesses.

J. W. PEPPER.

Witnesses:
J. FRANCIS BACON,
J. DANIEL EBY.